(12) United States Patent
Kim

(10) Patent No.: US 10,879,509 B2
(45) Date of Patent: Dec. 29, 2020

(54) RECHARGEABLE BATTERY

(71) Applicant: SAMSUNG SDI CO., LTD., Yongin-si (KR)

(72) Inventor: Seung-Mo Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 1498 days.

(21) Appl. No.: 14/019,706

(22) Filed: Sep. 6, 2013

(65) Prior Publication Data

US 2014/0315077 A1  Oct. 23, 2014

(30) Foreign Application Priority Data

Apr. 19, 2013  (KR) ........................ 10-2013-0043755

(51) Int. Cl.
*H01M 2/16* (2006.01)
*H01M 10/04* (2006.01)

(52) U.S. Cl.
CPC ......... *H01M 2/1606* (2013.01); *H01M 10/04* (2013.01)

(58) Field of Classification Search
CPC .... H01M 2/1606; H01M 2/06; H01M 2/1613; H01M 2/162; H01M 2/34; H01M 10/04
USPC ........................................................ 429/186
See application file for complete search history.

(56) References Cited

U.S. PATENT DOCUMENTS

| | | | |
|---|---|---|---|
| 7,704,637 B2 | 4/2010 | Yan et al. | |
| 2006/0105237 A1* | 5/2006 | Oh | H01M 2/021 429/180 |
| 2006/0105238 A1* | 5/2006 | Woo | H01M 2/0267 429/180 |
| 2008/0160397 A1* | 7/2008 | Singleton et al. | 429/100 |
| 2009/0104529 A1 | 4/2009 | Nishino et al. | |
| 2011/0129709 A1* | 6/2011 | Ahn | H01M 10/4235 429/94 |
| 2011/0135999 A1 | 6/2011 | Kwak et al. | |
| 2011/0136000 A1 | 6/2011 | Moon et al. | |
| 2011/0256436 A1* | 10/2011 | Eo | 429/94 |
| 2012/0028091 A1* | 2/2012 | Park | 429/94 |
| 2012/0114990 A1* | 5/2012 | Jeong et al. | 429/72 |
| 2013/0149570 A1* | 6/2013 | Han | H01M 2/347 429/61 |
| 2013/0189567 A1* | 7/2013 | Yang | H01M 2/0207 429/178 |
| 2013/0236773 A1* | 9/2013 | Nagata | 429/176 |
| 2013/0288100 A1* | 10/2013 | Dunkel et al. | 429/120 |
| 2013/0337956 A1* | 12/2013 | Motozaki | F16G 1/08 474/205 |
| 2014/0308555 A1* | 10/2014 | Hattori | H01M 10/0431 429/94 |

FOREIGN PATENT DOCUMENTS

| | | | | |
|---|---|---|---|---|
| EP | 2330661 A1 * | 6/2011 | ......... | H01M 2/0285 |
| JP | 10-144326 A | 5/1998 | | |
| JP | 2005-005138 A | 1/2005 | | |
| KR | 10-2008-0022139 A | 3/2008 | | |
| KR | 10-2008-0110679 A | 12/2008 | | |
| KR | 10-2011-0065373 A | 6/2011 | | |
| KR | 10-1100948 B1 | 12/2011 | | |
| KR | 10-2012-0052211 A | 5/2012 | | |
| KR | 10-2012-0117122 A | 10/2012 | | |

OTHER PUBLICATIONS http://www.toray.us/products/fibers/fib_012.html accessed on Jan. 29, 2017.*
https://www.britannica.com/science/aramid accessed Mar. 1, 2017.*
https://www.mitsuichemicals.com/film_cp_cast_polypropylene.htm accessed May 1, 2017.*
http://www.plastic-products.com/spec1.htm accessed May 1, 2017.*
http://www.coveme.com/nomex-aramid-paper-and-pressboard accessed Jun. 7, 2017.*
Notice of Allowance dated Dec. 19, 2016 of the priority Korean Patent Application No. 10-2013-0043755.
Korean Office Action dated Jun. 2, 2016 in Corresponding Korean Patent Application No. 10-2013-0043755.

* cited by examiner

*Primary Examiner* — Anca Eoff
(74) *Attorney, Agent, or Firm* — Lee IP Law, P.C.

(57) ABSTRACT

A rechargeable battery includes an electrode assembly including a first electrode and a second electrode; a case receiving the electrode assembly; and at least one block layer between the case and the electrode assembly, wherein the block layer is made of a fiber material.

7 Claims, 9 Drawing Sheets

101

RECHARGEABLE BATTERY

CROSS-REFERENCE TO RELATED APPLICATION

Korean Patent Application No. 10-2013-0043755, filed on Apr. 19, 2013, in the Korean Intellectual Property Office, and entitled: "Rechargeable Battery," is incorporated by reference herein in its entirety.

BACKGROUND

1. Field

Embodiments relate to a rechargeable battery.

2. Description of the Related Art

A rechargeable battery can be repeatedly charged and discharged, unlike a primary battery that cannot be repeatedly charged and discharged. A low-capacity rechargeable battery may be used in small and portable electronic devices, e.g., mobile phones, laptop computers, and camcorders. A high-capacity battery may be used as a power source for driving a motor in a hybrid vehicle.

A high-power rechargeable battery may use a non-aqueous electrolyte and may have a high energy density. The high-power rechargeable batteries may be formed of a plurality of rechargeable batteries coupled in series so that the plurality of rechargeable batteries may be used to drive a motor in, e.g., an electric vehicle requiring high power. Such a rechargeable battery may be formed in a cylindrical shape or a prismatic shape.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

The embodiments may be realized by providing a rechargeable battery including an electrode assembly including a first electrode and a second electrode; a case receiving the electrode assembly; and at least one block layer between the case and the electrode assembly, wherein the block layer is made of a fiber material.

The rechargeable battery may further include a conductive plate electrically connected with the second electrode, the conductive plate being between the electrode assembly and the case.

The case may be electrically connected with the first electrode.

The block layer may have a tensile strength of about 1 Gpa to about 5 Gpa.

The block layer may have a tensile strength of about 3.4 Gpa to about 5 Gpa.

A melting point of the block layer may be about 150° C. to about 450° C.

A melting point of the block layer may be about 370° C. to about 450° C.

The block layer may have a thickness of about 150 μm to about 2,000 μm.

The block layer may be between each side of the electrode assembly and the conductive plate.

The block layer may be between the conductive plate and the case.

At least two block layers are provided between the electrode assembly and the case.

The at least one block layer may include a first block layer between the case and the conductive plate, and a second block layer between the electrode assembly and the conductive plate, and a thickness of the first block layer may be greater than a thickness of the second block layer.

The thickness of the first block layer may be about two times greater than the thickness of the second block layer.

The fiber material of the block layer may include one selected from the group of an aramid fiber, a glass fiber, a carbon fiber, a polybenzoxazole (PBO) fiber, and an ultra-high molecular-weight polyethylene (UHMWPE) fiber.

The block layer may be made of a para aramid fiber material.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
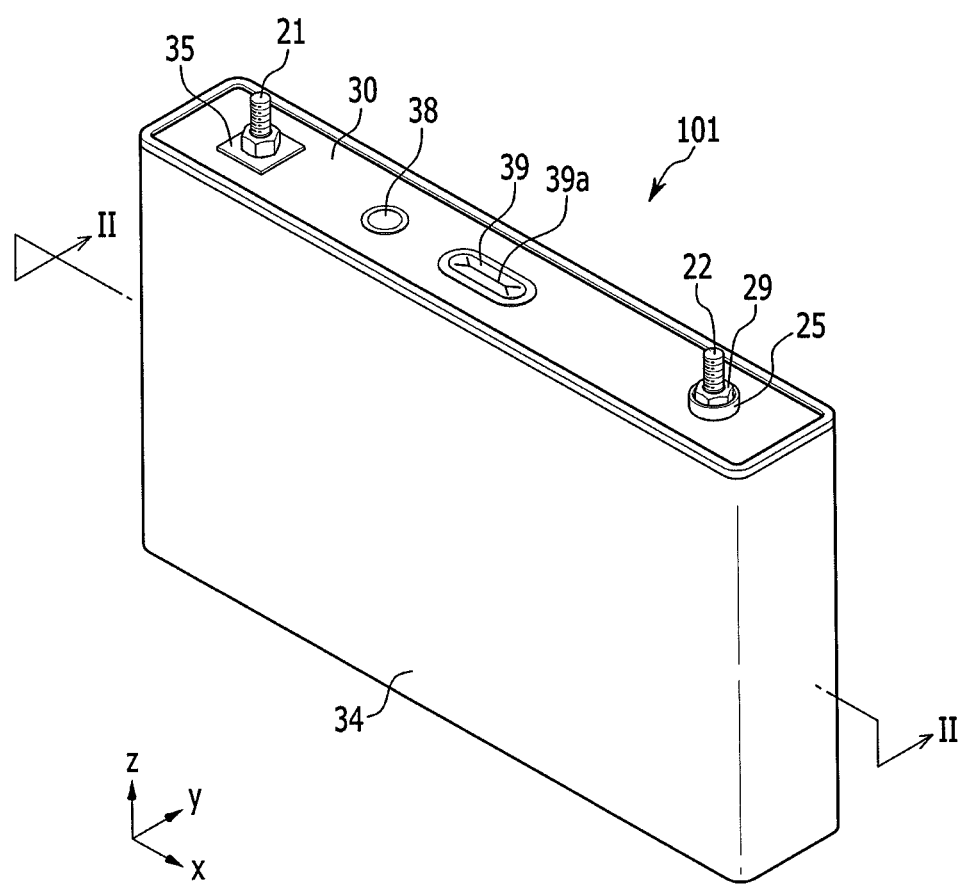
FIG. 1 illustrates a perspective view of a rechargeable battery according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present.

In the following detailed description, only certain exemplary embodiments of the present invention have been shown and described, simply by way of illustration. Like reference numerals designate like elements throughout the specification.

Figure 2:
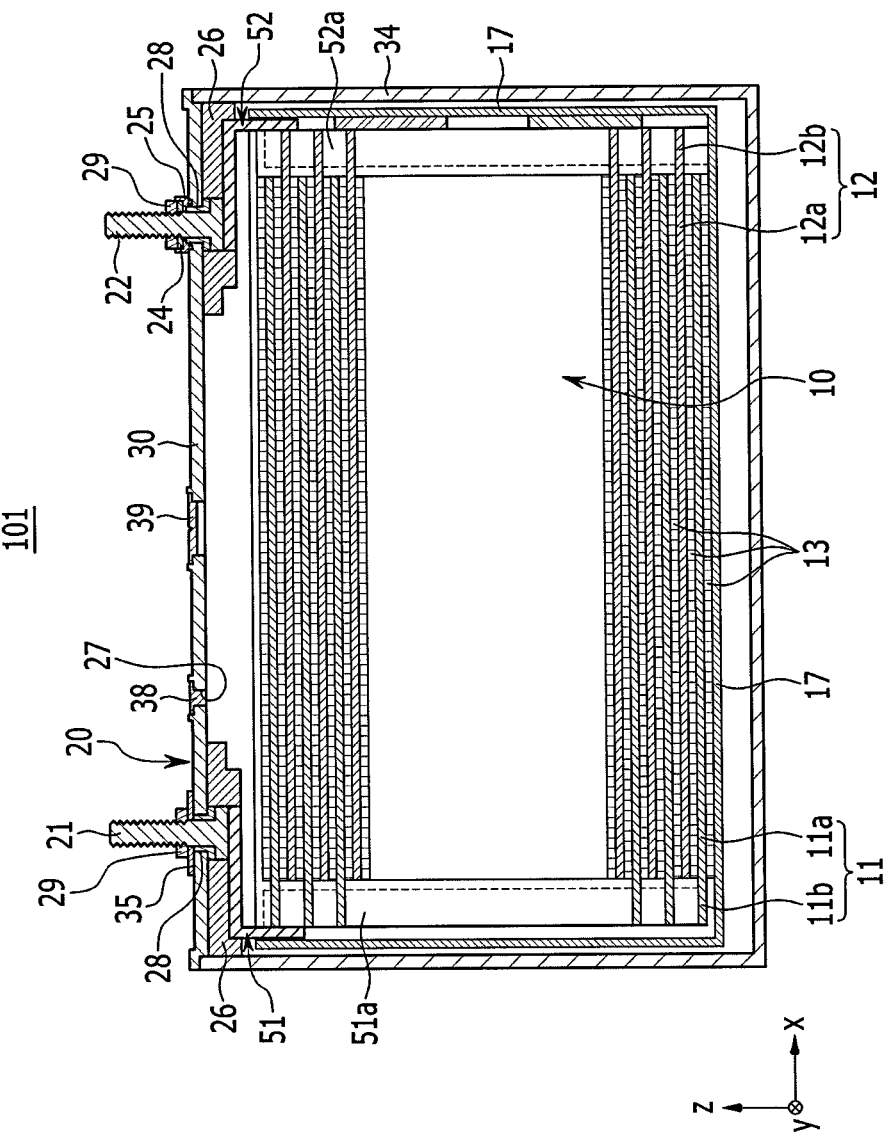
FIG. 2 illustrates a cross-sectional view of FIG. 1, taken along the line II-II.
Figure 3:
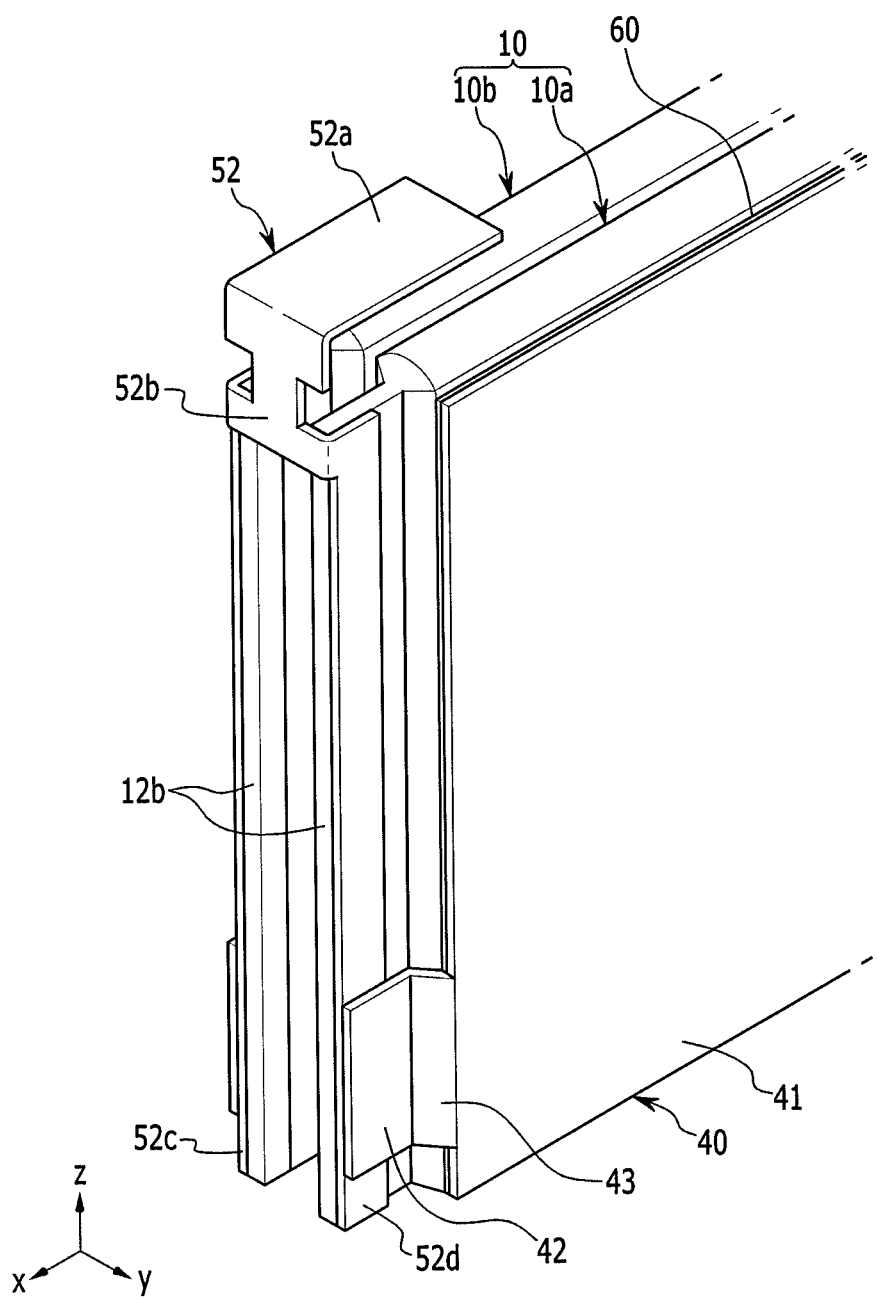
FIG. 3 illustrates a partial perspective view of an electrode assembly, a current collector, and a safety member according to the first exemplary embodiment.

FIG. 1 illustrates a perspective view of a rechargeable battery according to a first exemplary embodiment. FIG. 2 illustrates a cross-sectional view of FIG. 1, taken along the line II-II. FIG. 3 illustrates a partial perspective view of the electrode assembly, the current collecting member, and a safety member according to the first exemplary embodiment.

Referring to FIG. 1 and FIG. 2, a rechargeable battery 101 according to the first exemplary embodiment may include an electrode assembly 10 or a plurality of electrode assemblies 10, a case 34 in which the electrode assembly 10 or the plurality of electrode assemblies 10 are installed, and a cap assembly 20 coupled to an opening of the case 34. Each of the plurality of electrode assemblies 10 may be formed by spirally winding a positive electrode 11 and a negative electrode 12, interposing a separator 13 therebetween.

The rechargeable battery 101 according to the first exemplary embodiment is exemplarily illustrated as a lithium ion secondary battery formed in cuboid or prismatic shape. However, the embodiments are not limited thereto, and the embodiments may be applied to various-shaped batteries including a lithium polymer battery or a cylindrical battery.

The positive electrode 11 may include a positive electrode coated region 11a (which is an area where an active material is coated to a current collector formed of a metal foil of a thin plate such as aluminum and the like) and a positive electrode uncoated region 11b (which is an area where the active material is not coated). The negative electrode 12 may include a negative electrode coated region 12a (which is an area where the active material is coated to a current collector formed of a metal foil of a thin plate such as copper and the like) and a negative electrode uncoated region 12b (which is an area not coated with the active material).

Figure 4:
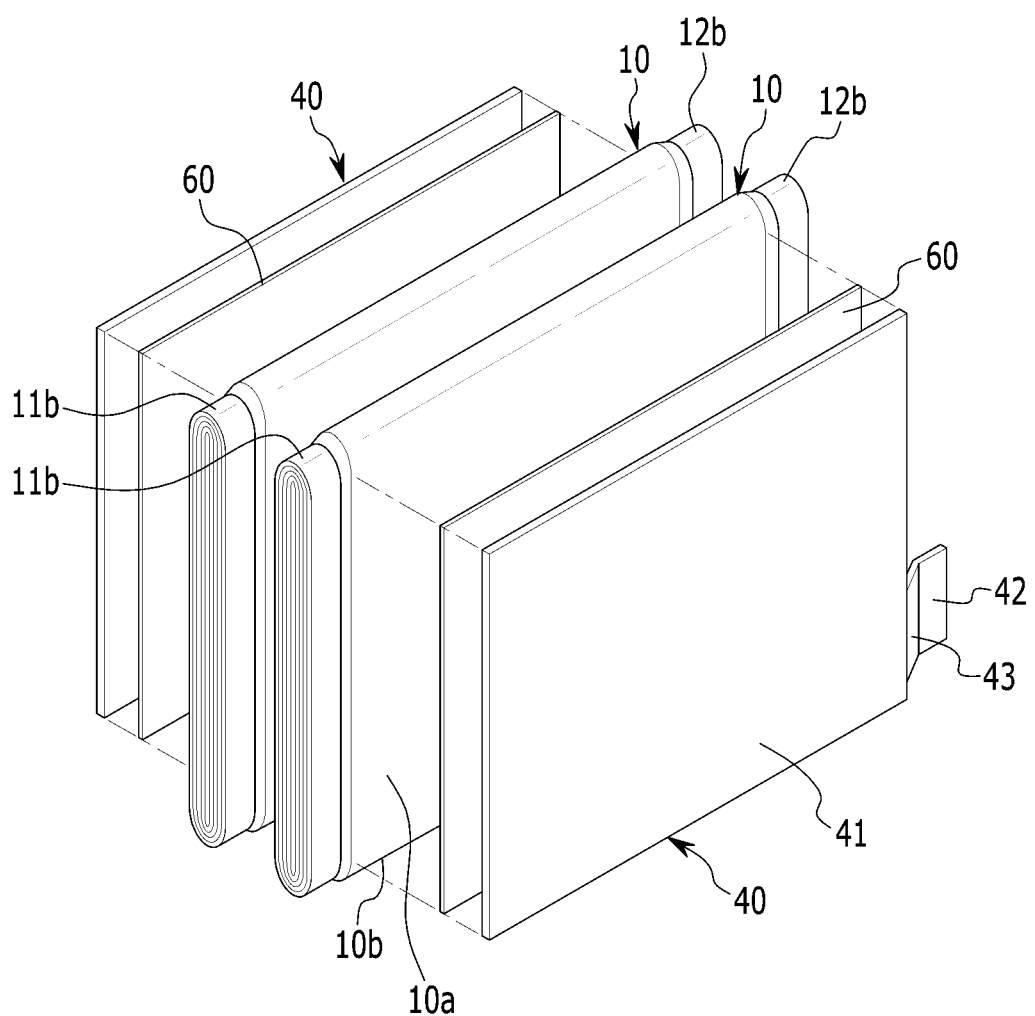
FIG. 4 illustrates an exploded perspective view of the electrode assembly and the safety member according to the first exemplary embodiment.

Here, the positive electrode 11 may be a first electrode connected with the case 34, and the negative electrode 12 may be a second electrode connected with safety members 41 and 42 (refer to FIG. 4). In addition, in the present exemplary embodiment, two electrode assemblies 10 are installed in the case 34, but the embodiments are not limited thereto. A plurality of electrode assemblies may be installed in the case.

The positive electrode uncoated region 11b may be formed at one side end of the positive electrode 11 along a length direction of the positive electrode 11, and the negative uncoated region 12b may be formed at the other side end of the negative electrode along a length direction of the negative electrode 12. In addition, the positive electrode 11 and the negative electrode 12 may be spirally wound after interposing the separator 13, which is an insulator, therebetween.

However, the embodiments are not limited thereto, and the electrode assembly 10 may have a structure in which a positive electrode and a negative electrode formed of a plurality of sheets are alternately layered, interposing a separator therebetween.

The case 34 may be substantially formed in the shape of a cuboid, and an opening may be formed at one surface of the case 34. An insulation encapsulation 17 may be provided between the case 34 and the electrode assembly 10 for insulation therebetween. The insulation encapsulation 17 may be formed in the shape of a film, and an upper portion thereof may be opened.

The cap assembly 20 may include a cap plate 30 (covering the opening of the case 34), a positive terminal 21 (protruding to the outside of the cap plate 30 and electrically connected with the positive electrode 11), a negative terminal 22 (protruding to the outside of the cap plate 30 and electrically connected with the negative electrode 12), and a vent member 39 (having a notch 39a formed therein). The notch 39a may be ruptured in response to a predetermined internal pressure.

The cap plate 30 may be formed of a thin plate, and an electrolyte injection opening 27 may be formed at one side of the cap plate 30 for injection of an electrolyte solution, and a sealing cap 38 may be provided in the electrolyte injection opening 27.

A lower gasket 28 may be provided between the cap plate 30 and the terminals 21 and 22 to seal between the cap plate 30 and the terminals 21 and 22. In the present exemplary embodiment, the terminals 21 and 22 may include the positive electrode terminal 21 and the negative electrode terminal 22.

The lower gasket 28 may be fitted to a terminal hole, and may be closely attached to the bottom surface of the cap plate 30. The terminals 21 and 22 may be formed in the shape of a circular cylinder, and nuts 29 may be provided to support the terminals 21 and 22 in the upper portions thereof, and screw threads may be formed on the outer peripheries of the terminals so that the nuts 29 may be fastened to the outer peripheries of the terminals 21 and 22.

A connection plate 35 may be inserted to the positive terminal 21, and the connection plate 35 may be provided between the nut 29 and the cap plate 30. The connection plate 35 may electrically connect the cap plate 30 and the positive electrode terminal 21. Accordingly, the cap plate 30 and the case 34 may be electrically connected with the positive electrode 11.

An upper gasket 25 may be inserted to an upper portion of the negative terminal 22, and the upper gasket 25 may be disposed on the lower gasket 28 and thus may contact the upper surface of the cap plate 30. The upper gasket 25 may insulate the negative terminal 22 and the cap plate 30. A washer 24 may be provided on the upper gasket 25 for buffering a fastening force between the nut 29 and the upper gasket 25. Lower insulation members 26 may be provided in lower portions of the terminals 21 and 22 for insulation of the cap plate 30 and the terminals 21 and 22.

A current collecting member 51 (electrically connected with the positive electrode 11) may be attached to the positive electrode terminal 21 by welding, and the positive electrode terminal 21 and the current collecting member 51 may be fitted to grooves formed in the bottom surfaces of the lower insulation members 26. The current collecting member 51 may be provide with a plurality of tabs 51a protruding downwardly, and each of the plurality of tabs 51a may be attached to the positive electrode uncoated region 11b by welding.

A current collecting member 52 (electrically connected with the negative electrode 12) may be attached to the negative terminal 22 by welding, and the negative electrode terminal 22 and the current collecting member may be fitted to grooves formed in the bottom surfaces of the lower insulation members 26. As shown in FIG. 3, the current collecting member 52 may include an upper plate 52a, a side plate 52b bent downward from the upper plate 52a, and a plurality of tabs 52c and 52d bent toward the electrode assembly 10 from lateral ends of the side plate 52b and disposed in parallel with the negative electrode uncoated region 12b.

A conductive plate 40 (electrically connected to the negative electrode 12) may be provided at external sides of the electrode assemblies 10.

Figure 5:
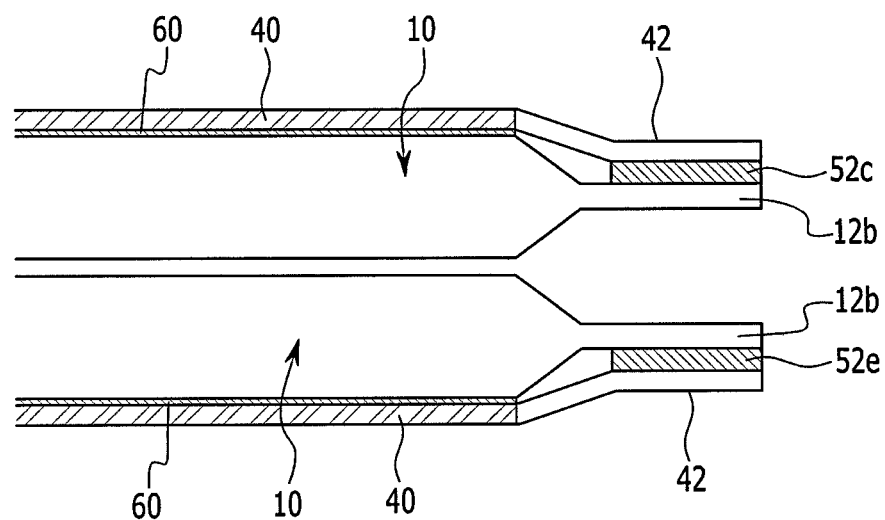
FIG. 5 illustrates a cross-sectional view illustrating a state in which the members shown in FIG. 4 are coupled with each other.

FIG. 4 illustrates an exploded perspective view of the electrode assembly and the safety member according to the first exemplary embodiment. FIG. 5 illustrates a cross-sectional view of a state in which the members shown in FIG. 4 are coupled to each other.

Referring to FIG. 3 to FIG. 5, the conductive plate 40 may be disposed at lateral external sides of the layered electrode assemblies 10. For example, the electrode assembly 10 may include a plain or flat surface 10a and curved portions 10b at, e.g., upper and lower, ends of the flat surface 10a. The conductive plate 40 may be disposed in parallel with the flat surface 10a.

The conductive plate 40 may include a side plate 41 facing to the outside of the battery from the electrode assembly 10. The side plate 41 may be attached to or coupled with the flat surface 10a of the electrode assembly 10. The conductive plate 40 may include a connection protrusion 42 connected to the side plate 41 and fixed to or coupled with the tabs 52c and 52d of the current collecting member 52. For example, the connection protrusion 42 may be parallel with the side plate 41. An inclined portion 43 may be provided between the side plate 41 and the connection protrusion 42. The inclined portion 43 may be inclined with respect to the side plate 41 and the connection protrusion 42. In an implementation, the inclined portion 43 may be disposed in parallel with or nearly parallel with an inclined portion of the negative electrode uncoated region 12b. In the present exemplary embodiment, the connection protrusion 42 is connected to the tabs 52c and 52d, but the embodiments are not limited thereto. In an implementation, the connection protrusion 42 may be directly connected to the negative electrode uncoated region 12b.

The side plate 41 may be formed of a conductive metal plate, e.g., copper, stainless steel, or the like. A block layer 60, e.g., at least one block layer 60, may be provided between the side plate 41 and the electrode assembly 10. The block layer 60 may be made of a fiber material. For example, the fiber material may have high tensile strength and high heat resistance. The block layer 60 may have a tensile strength of about 1 Gpa to about 5 Gpa, and may have a melting point of about 150° C. to about 450° C. In an implementation, the block layer 60 may have a thickness (e.g., in a direction orthogonal to a plane of the block layer 60) of about 150 μm to 2,000 μm.

The block layer 60 may be formed of, e.g., an aramid fiber, a glass fiber, a carbon fiber, a polybenzoxazole (PBO) fiber, or an ultra-high molecular-weight polyethylene (UHMWPE) fiber.

In an implementation, the block layer 60 may be formed of a para aramid fiber. The para aramid fiber may have an excellent tensile strength of, e.g., about 3.4 Gpa, and may resist heat of about 370° C., e.g., may have a melting point of about 370° C. Thus, generation of an arc due to permeation of a conductive foreign material may be reduced and/or completely blocked.

When the block layer 60 is made of the fiber material having high tensile strength and high heat resistance, generation of an arc caused by a burr generated from the case 34 or the conductive plate 40 due to permeation or penetration of the conductive foreign material may be reduced and/or prevented.

The following Example and Comparative Example are provided in order to highlight characteristics of one or more embodiments, but it will be understood that the Example and Comparative Example are not to be construed as limiting the scope of the embodiments, nor is the Comparative Example to be construed as being outside the scope of the embodiments. Further, it will be understood that the embodiments are not limited to the particular details described in the Example and Comparative Example. Based on the above-stated contents, the embodiments were applied to and tested in a 34Ah prismatic-shaped lithium secondary battery.

(Manufacturing of a Rechargeable Battery)

As a positive electrode active material, a nickel-cobalt manganese (NCM)-based material was used. The positive electrode active material, polyvinylidene fluoride (PVDF), and a Denka Black were mixed with a weight ratio of 92:4:4 in an N-methyl pyrolidone solvent to manufacture a positive electrode active material slurry. The positive electrode active material slurry was uniformly coated to an aluminum current collector having a thickness of 12 μm and dried, and then rolled such that the positive electrode was manufactured.

As a negative electrode active material, a carbon-based negative electrode active material was used. 97.5 wt % of the negative electrode active material, 1.5 wt % of a binder, 1 wt % of a viscosifier agent were mixed using water as a solvent such that a negative electrode active material slurry was manufactured. The negative electrode active material slurry was coated to a copper current collector and dried, and then rolled such that a negative electrode was manufactured.

A lithium secondary battery was manufactured using the above-described positive electrode, the above-described negative electrode, an electrolyte solution, and a separator made of a polypropylene/polyethylene/polypropylene-based material. As the electrolyte solution, a carbonate-based solution where $LiPF_6$ lithium salt was dissolved was used.

In order to observe the effects, a battery (Example) employing a block layer made of an aramid fiber and having a thickness of 0.5 mm, and a battery (Comparative Example) not employing a block layer were manufactured. A nail having a diameter of 3 mm was completely penetrated through a center of each of the batteries at a speed of 80 mm/s such that the following result was observed.

TABLE 1

| | Capacity (Ah) | Voltage (V) | Aramid block layer | Penetration result |
|---|---|---|---|---|
| Comparative Example | 34 | 4.191 | Not employed | Flame generated |
| Example | 34 | 4.195 | Employed | Smoke generated |

As may be seen in Table 1, above, in the case of the battery that did not employ the block layer, flame was generated and thus ignition occurred. However, in the rechargeable battery according to the Example, smoke was generated but no ignition occurred.

Figure 8:
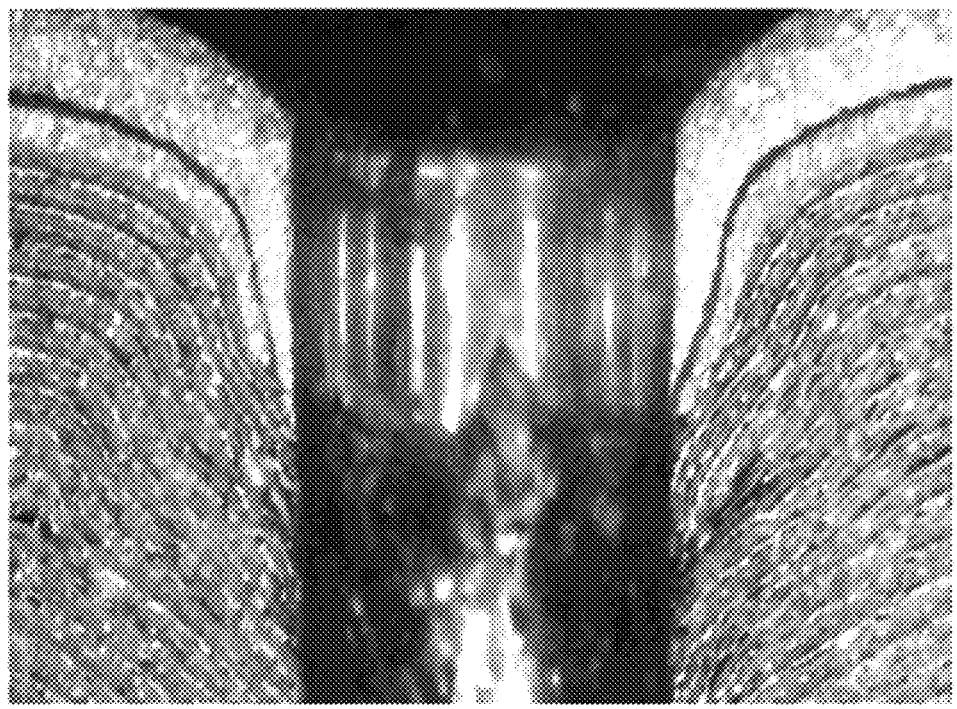
FIG. 8 illustrates an image showing a cross-section of a comparative rechargeable battery having a nail inserted therein.
Figure 9:
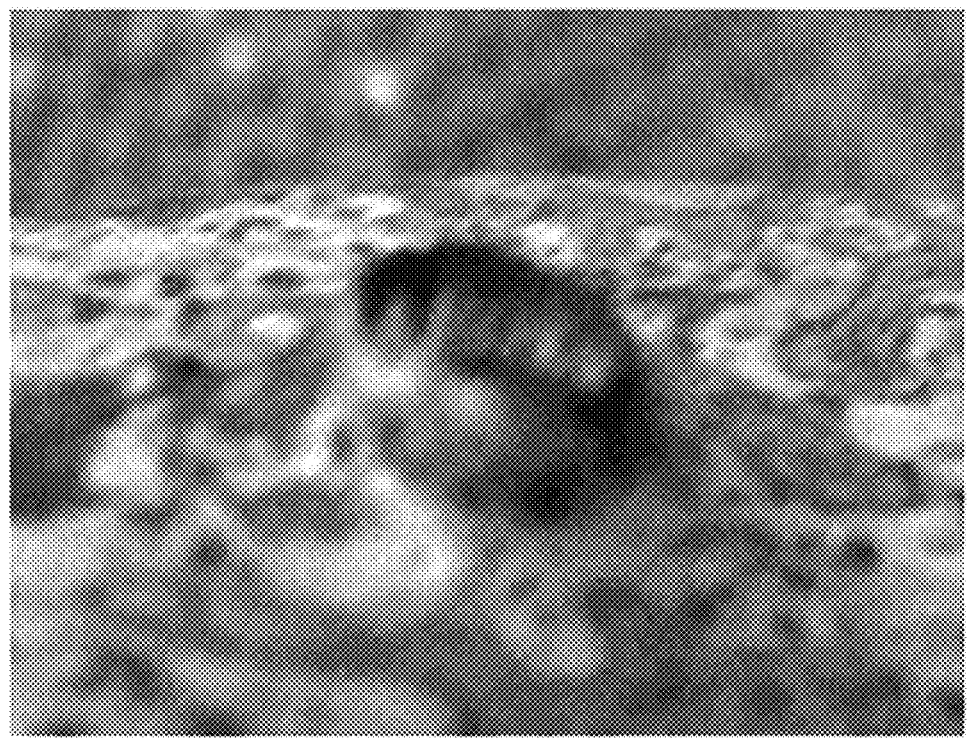
FIG. 9 illustrates an image showing a comparative rechargeable battery where a burr is formed due to insertion of a nail.

FIG. 8 illustrates an image showing a cross-section of a comparative rechargeable battery having a nail inserted therein. FIG. 9 illustrates an image showing a comparative rechargeable battery where a burr is formed due to insertion of a nail. As may be seen in FIG. 8 and FIG. 9, when a conductive foreign material enters from the outside, a burr protruding to the inside of the case may be formed in the case and the conductive plate. Such a burr may contact the electrode assembly, and when the electrode assembly and the bur contact, a potential different in a narrow contact area may be generated, thereby causing generation of an arc. When the arc is generated, firing or ignition of an ignitable material, e.g., the electrolyte solution, may be accelerated, thereby causing ignition or explosion of the rechargeable battery.

However, when the block layer 60 (made of a fiber material having a high tensile strength) is provided, as in the embodiments, direct contact between the burr and the electrode assembly may be prevented, thereby preventing generation of an arc. In addition, the fiber material may be made of a material having high heat resistance. Thus, the block layer 60 may not melt, even if heat is generated due to a short-circuit current so that generation of the arc may be stably prevented.

Figure 6:
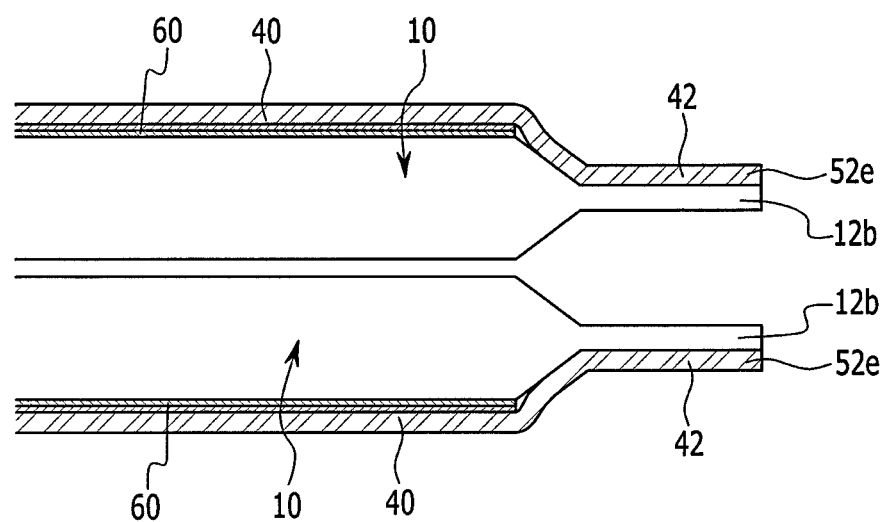
FIG. 6 illustrates a cross-sectional view of an electrode assembly and a safety member according to a second exemplary embodiment.

FIG. 6 illustrates a cross-sectional view of a state in which a conductive plate is installed in an electrode assembly according to a second exemplary embodiment.

Referring to FIG. 6, a rechargeable battery according to the second exemplary embodiment may be the same as the rechargeable battery of the first exemplary embodiment, except for a number of block layers 60 present. The rechargeable battery according to the present exemplary embodiment may include a conductive plate 40 and a pair of block layers 60 adjacent thereto. For example, the two block layers 60 may be provided between an electrode assembly 10 and each conductive plate 40. In addition, as illustrated in FIG. 6, the conductive plate 40 according to the present exemplary embodiment may be directly attached to a negative electrode uncoated region 12b. In the present exemplary embodiment, the two block layers 60 are exemplarily installed. However, in an implementation, at least two, e.g., more than two, block layers 60 may be included between, e.g., each side of, the electrode assembly and the conductive plate 40.

As in the present exemplary embodiment, when a plurality of block layers 60 are installed between the electrode assembly 10 and each conductive plate 40, a tensile strength of the block layer 60 may be increased so that generation of an arc can be further reduced and/or completely prevented.

Figure 7:
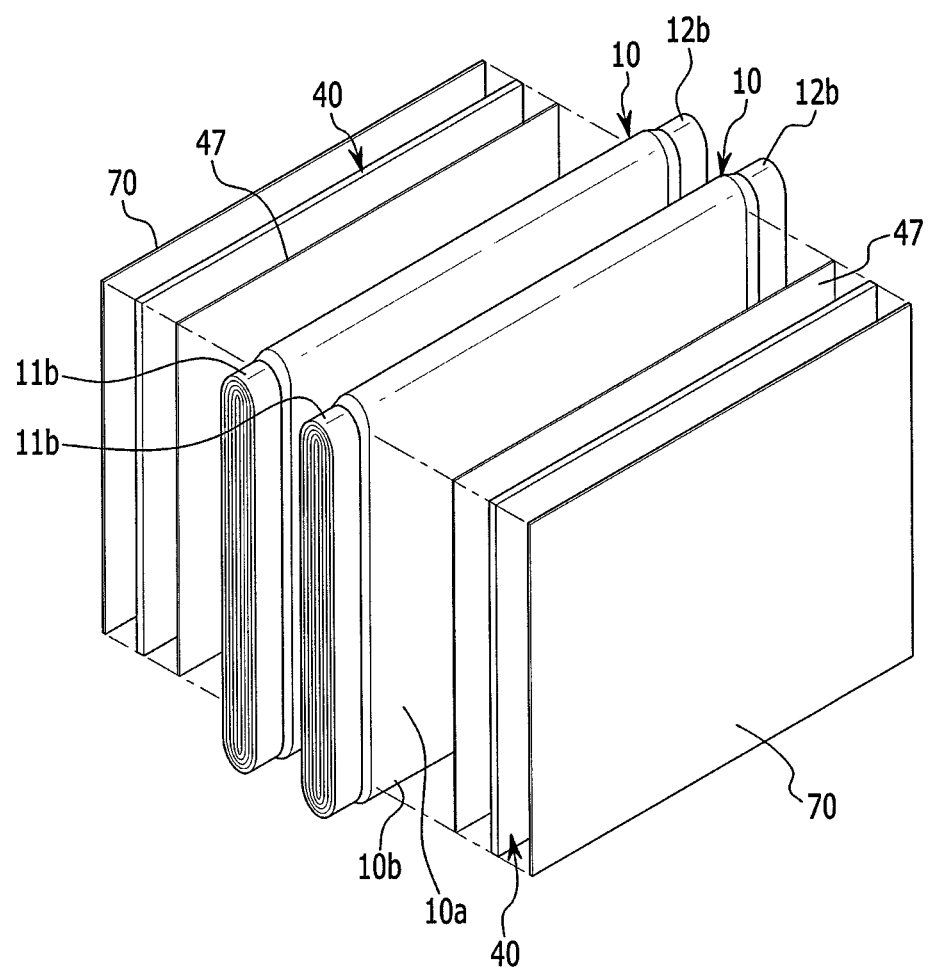
FIG. 7 illustrates an exploded perspective view of an electrode assembly and a safety member according to a third exemplary embodiment.

FIG. 7 illustrates an exploded perspective view of an electrode assembly and a conductive plate according to a third exemplary embodiment.

Referring to FIG. 7, a rechargeable battery according to the third exemplary embodiment may be the same as the rechargeable battery of the first exemplary embodiment, except for an installation structure of a block layer. Thus, a repeated description for the same structure may be omitted.

A rechargeable battery according to the present exemplary embodiment may include, e.g., a conductive plate 40, a first block layer 70 (adjacent to a first surface of the conductive plate 40), and a second block layer 47 (adjacent to a second surface of the conductive plate 40 that faces an opposite direction of the first surface). The first block layer 70 may be disposed between a case 34 and the conductive plate 40, and the second block layer 47 may be disposed between the conductive plate 40 and the electrode assembly 10. In an implementation, a thickness of the first block layer 70 may be greater than a thickness of the second block layer 47. For example, the thickness of the first block layer 70 may be two times the thickness of the second block layer 47.

As in the above-stated first exemplary embodiment, the case 34 may be positively charged, and the conductive plate 40 may be negatively charged. As in the present exemplary embodiment, the first block layer 70 may be provided between the case 34 and the conductive plate 40. Thus, generation of an arc due to a short-circuit of the conductive plate 40 and the case 34 (caused by a burr formed in the case 34 due to permeation or penetration of a conductive foreign material) may be reduced and/or prevented. In addition, the thickness of the first block layer 70 may be greater than the thickness of the second block layer 47. Thus, generation of an arc at a location of an initial short-circuit may be further reduced and/or completely blocked.

By way of summation and review, if a conductive foreign material, e.g., a nail or an awl, were to enter into the rechargeable battery from the outside, a short-circuit may occur in the rechargeable battery. When the short-circuit occurs, an internal temperature of the rechargeable battery may be rapidly increased so that the rechargeable battery may ignite or explode.

The embodiments provide a rechargeable battery having an improved safety apparatus.

The embodiments provide a rechargeable battery that may help prevent generation of an arc caused by a burr generated due to permeation or penetration of a conductive foreign material.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly including a first electrode and a second electrode;
   a case receiving the electrode assembly, the case being electrically connected with the first electrode;
   a first block layer and a second block layer between the case and the electrode assembly;
   a conductive plate electrically connected with the second electrode, the conductive plate being between the electrode assembly and the case and extending in parallel with and along a flat side of the electrode assembly,
   wherein:
   the first block layer and the second block layer are made of a fiber material,
   the first block layer is between the case and the conductive plate, and
   the second block layer is between the electrode assembly and the conductive plate,
   a thickness of the first block layer is at least two times greater than a thickness of the second block layer, and
   melting points of the first block layer and the second block layer are about 370° C. to about 450° C.

2. The rechargeable battery as claimed in claim 1, wherein tensile strengths of the first block layer and the second block layer are about 1 GPa to about 5 GPa.

3. The rechargeable battery as claimed in claim 1, wherein tensile strengths of the first block layer and the second block layer are about 3.4 GPa to about 5 GPa.

4. The rechargeable battery as claimed in claim 1, wherein thicknesses of the first block layer and the second block layer are about 150 μm to about 2,000 μm.

5. The rechargeable battery as claimed in claim 1, wherein the fiber material of the first block layer and the second block layer includes one selected from the group of an aramid fiber, a glass fiber, a carbon fiber, a polybenzoxazole (PBO) fiber, and an ultra-high molecular-weight polyethylene (UHMWPE) fiber.

6. The rechargeable battery as claimed in claim 1, wherein the first block layer and the second block layer are made of a para aramid fiber material.

7. The rechargeable battery as claimed in claim 1, wherein the first block layer is directly between the case and the conductive plate.

* * * * *